(12) United States Patent
He et al.

(10) Patent No.: US 10,783,561 B2
(45) Date of Patent: Sep. 22, 2020

(54) SYSTEMS AND METHODS FOR OPTIMIZING TARGETED ADVERTISING THROUGH SOCIAL MEDIA INTERACTIONS

(71) Applicant: WAL-MART STORES, INC., Bentonville, AR (US)

(72) Inventors: Jun He, Fremont, CA (US); Shankara Bhargava Subramanya, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 262 days.

(21) Appl. No.: 15/420,741

(22) Filed: Jan. 31, 2017

(65) Prior Publication Data

US 2018/0218407 A1    Aug. 2, 2018

(51) Int. Cl.
*G06Q 30/02* (2012.01)
*G06N 3/08* (2006.01)
*G06N 5/00* (2006.01)
*G06N 3/04* (2006.01)
*G06N 20/20* (2019.01)
*G06N 20/10* (2019.01)
*G06Q 50/00* (2012.01)

(52) U.S. Cl.
CPC ....... *G06Q 30/0269* (2013.01); *G06N 3/0454* (2013.01); *G06N 3/08* (2013.01); *G06N 5/003* (2013.01); *G06N 20/10* (2019.01); *G06N 20/20* (2019.01); *G06Q 30/0201* (2013.01); *G06Q 30/0277* (2013.01); *G06Q 50/01* (2013.01)

(58) Field of Classification Search
CPC .......... G06Q 30/0269; G06Q 30/0201; G06Q 30/0277; G06Q 50/01; G06N 3/08

USPC ...................................................... 705/14.66
See application file for complete search history.

(56) References Cited

U.S. PATENT DOCUMENTS

| | | |
|---|---|---|
| 2010/0076850 A1 | 3/2010 | Parekh et al. |
| 2010/0145773 A1 | 6/2010 | Desai et al. |
| 2013/0218678 A1 | 8/2013 | Benyamin et al. |

FOREIGN PATENT DOCUMENTS

WO    WO-2010048159 A2 *    4/2010    ............. G06Q 40/10

OTHER PUBLICATIONS

Rocco Alberto Baldassarre, 15 Ways to Optimize Your Facebook Ads, 2015 (Year: 2015).*

* cited by examiner

*Primary Examiner* — Tarek Elchanti
(74) *Attorney, Agent, or Firm* — Bryan Cave Leighton Paisner LLP (57) ABSTRACT

Systems and methods including one or more processing modules and one or more non-transitory storage modules storing computing instructions configured to run on the one or more processing modules and perform acts of accessing purchase information history from a website of an online retailer, training a first machine learning model configured to obtain first population demographic data for first products, coordinating a display of an advertisement associated with the first products on social media webpages of new users corresponding to at least a portion of the first population demographic data, receiving an indication that some of the new users selected the first advertisement, accessing additional information of the new users, training a second machine learning model configured to obtain additional data for the one or more first products, and coordinating a display of the first advertisement associated with the first products on additional social media webpages of additional new users.

20 Claims, 5 Drawing Sheets

| 405 – Accessing purchase information history for (1) one or more first products in a first subcategory of a category of products for sale by an online retailer and (2) one or more second products in a second subcategory of the category of products for sale by the retailer. |

↓

| 410 – Training a first machine learning model configured to obtain first population demographic data for the one or more first products. |

↓

| 415 – Performing one or more first iterations of the first machine learning model to obtain the first population demographic data for the one or more first products. |

↓

| 420 – Coordinating a first display of a first advertisement associated with the one or more first products on social media webpages of new users corresponding to a portion of the first population demographic data. |

↓

| 425 – Receiving an indication that one or more of the new users selected the first advertisement displayed on the social media webpages. |

↓

| 430 – Accessing additional information of the one or more of the new users. |

↓

| 435 – Training, using a second set of rules and the additional information of the one or more of the new users, a second machine learning model configured to obtain additional data for the one or more first products. |

↓

| 440 – Performing one or more second iterations of the second machine learning model to obtain the additional data for the one or more first products. |

↓

| 445 – Coordinating a second display of the first advertisement associated with the one or more first products on additional social media webpages of additional new users corresponding to at least a portion of the additional data for the one or more first products. |

SYSTEMS AND METHODS FOR OPTIMIZING TARGETED ADVERTISING THROUGH SOCIAL MEDIA INTERACTIONS

TECHNICAL FIELD

This disclosure relates generally to optimizing targeted advertising through social media interactions.

BACKGROUND

Advertisements on social media websites are very popular among advertisers because potential customers spend a significant amount of time on social media websites and/or social media mobile applications. For some products and services, it is relatively easy to target a specific population to show the advertisements. In an ecommerce or online retailer setting, however, it is more difficult to target specific populations because (1) different kinds of combination of products can be presented to users, and (2) different advertisement designs and product lists should target different populations.

BRIEF DESCRIPTION OF THE DRAWINGS

To facilitate further description of the embodiments, the following drawings are provided in which:

FIG. 4 is a flowchart for a method, according to certain embodiments; and

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of accessing purchase information history from a website of an online retailer for (1) one or more first products in a first subcategory of a category of products for sale by the online retailer and (2) one or more second products in a second subcategory of the category of products for sale by the retailer. The purchase information history can comprise demographic data of (a) a plurality of first users that have purchased the one or more first products and (b) a plurality of second users that have purchased the one or more second products. The one or more storage modules also can be configured to run on the one or more processing modules and perform an act of training, using a first set of rules and the purchase information history of the category of products, a first machine learning model configured to obtain first population demographic data for the one or more first products. The one or more storage modules also can be configured to run on the one or more processing modules and perform an act of performing one or more first iterations of the first machine learning model to obtain the first population demographic data for the one or more first products. The one or more storage modules also can be configured to run on the one or more processing modules and perform an act of coordinating a first display of a first advertisement associated with the one or more first products on social media webpages of new users corresponding to at least a portion of the first population demographic data. The one or more storage modules also can be configured to run on the one or more processing modules and perform an act of receiving an indication that one or more of the new users selected the first advertisement displayed on the social media webpages. The one or more storage modules also can be configured to run on the one or more processing modules and perform an act of accessing additional information of the one or more of the new users. The one or more storage modules also can be configured to run on the one or more processing modules and perform an act of training, using a second set of rules and the additional information of the one or more of the new users, a second machine learning model configured to obtain additional data for the one or more first products. The one or more storage modules also can be configured to run on the one or more processing modules and perform an act of performing one or more second iterations of the second machine learning model to obtain the additional data for the one or more first product. The one or more storage modules also can be configured to run on the one or more processing modules and perform an act of coordinating a second display of the first advertisement associated with the one or more first products on additional social media webpages of additional new users corresponding to at least a portion of the additional data for the one or more first products.

Various embodiments include a method. The method can include accessing purchase information history from a web site of an online retailer for (1) one or more first products in a first subcategory of a category of products for sale by the online retailer and (2) one or more second products in a second subcategory of the category of products for sale by the retailer. The purchase information history can comprise demographic data of (a) a plurality of first users that have purchased the one or more first products and (b) a plurality of second users that have purchased the one or more second products. The method also can include training, using a first set of rules and the purchase information history of the category of products, a first machine learning model configured to obtain first population demographic data for the one or more first products. The method also can include performing one or more first iterations of the first machine learning model to obtain the first population demographic data for the one or more first products. The method also can include coordinating a first display of a first advertisement associated with the one or more first products on social media webpages of new users corresponding to at least a portion of the first population demographic data. The method also can include receiving an indication that one or more of the new users selected the first advertisement displayed on the social media webpages. The method also can include accessing additional information of the one or more of the new users. The method also can include training, using a second set of rules and the additional information of the one or more of the new users, a second machine learning model configured to obtain additional data for the one or more first products. The method also can include performing one or more second iterations of the second machine learning model to obtain the additional data for the one or more first products. The method also can include coordinating a second display of the first advertisement associated with the one or more first products on additional social media webpages of additional new users corresponding to at least a portion of the additional data for the one or more first products.

Figure 1:
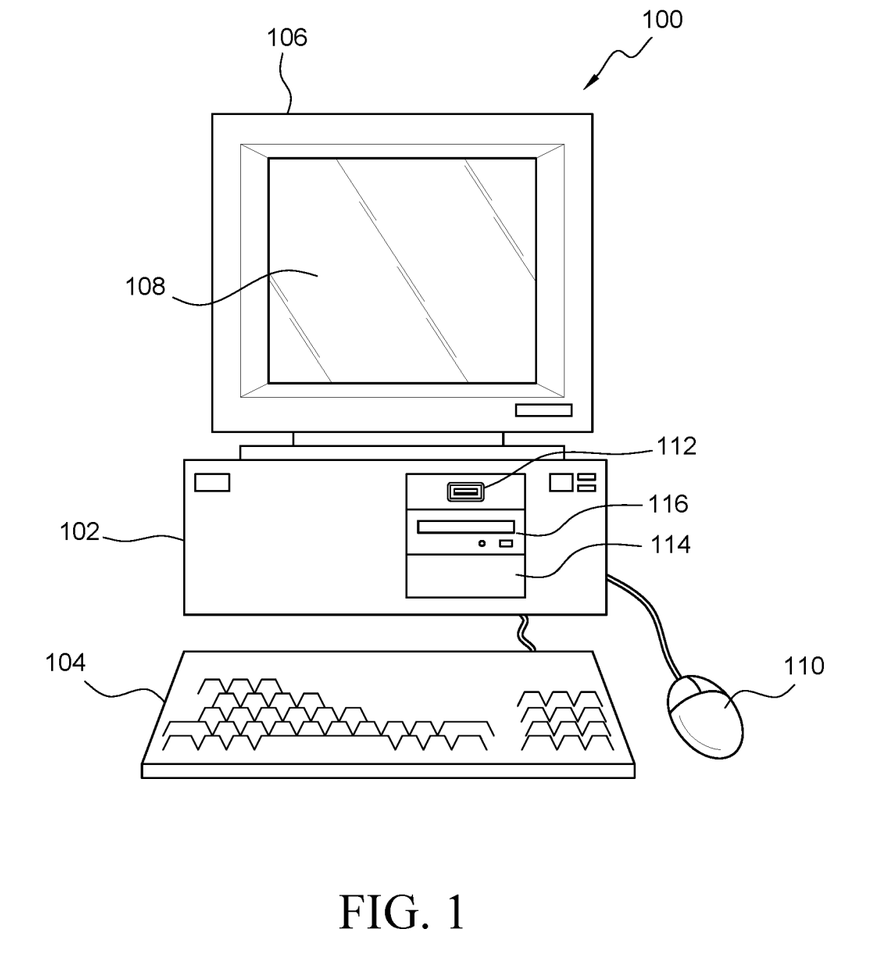
FIG. 1 illustrates a front elevational view of a computer system that is suitable for implementing various embodiments of the systems disclosed in FIGS. 3 and 5.
Figure 2:
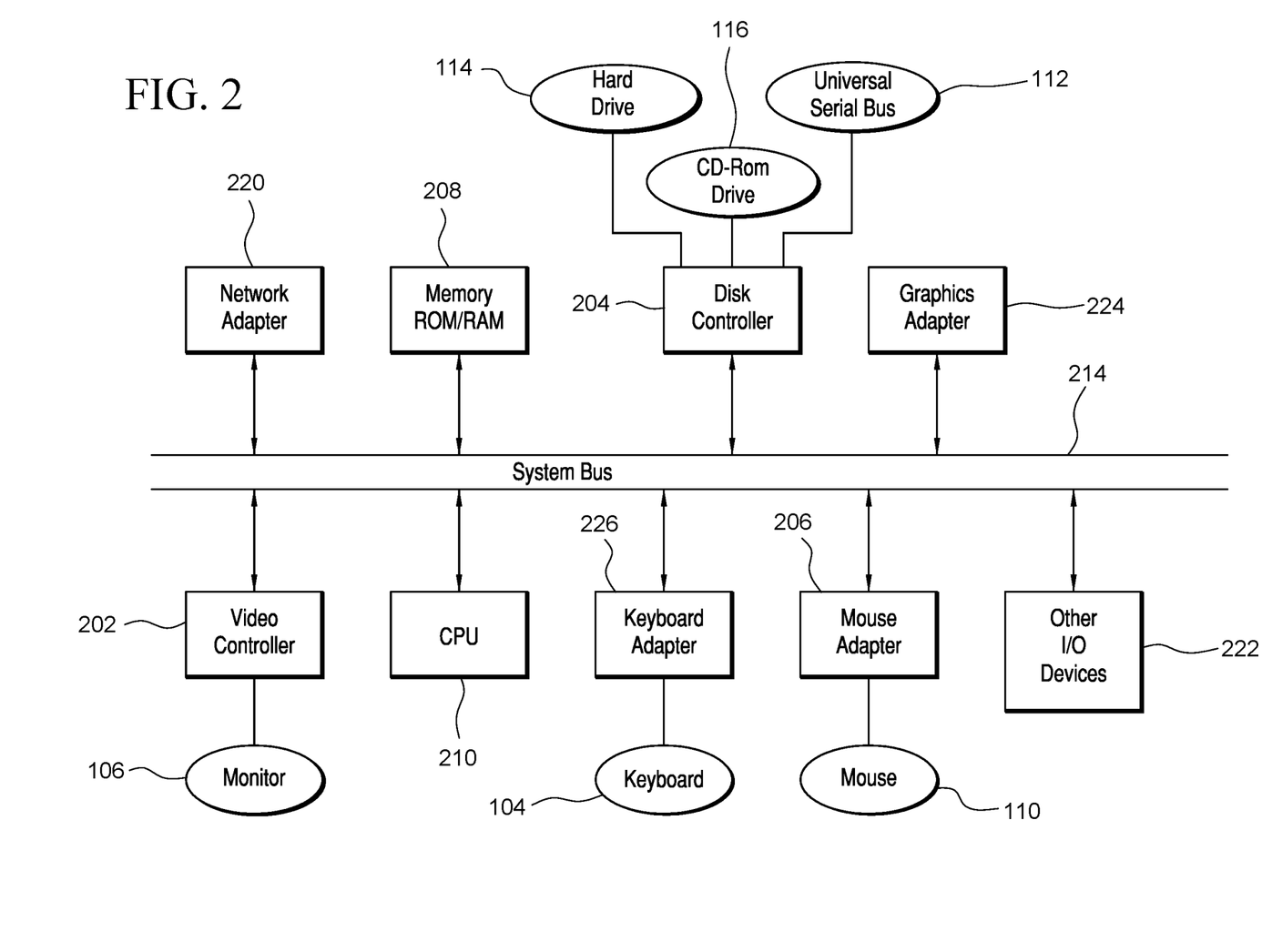
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module (s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wa., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wa., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
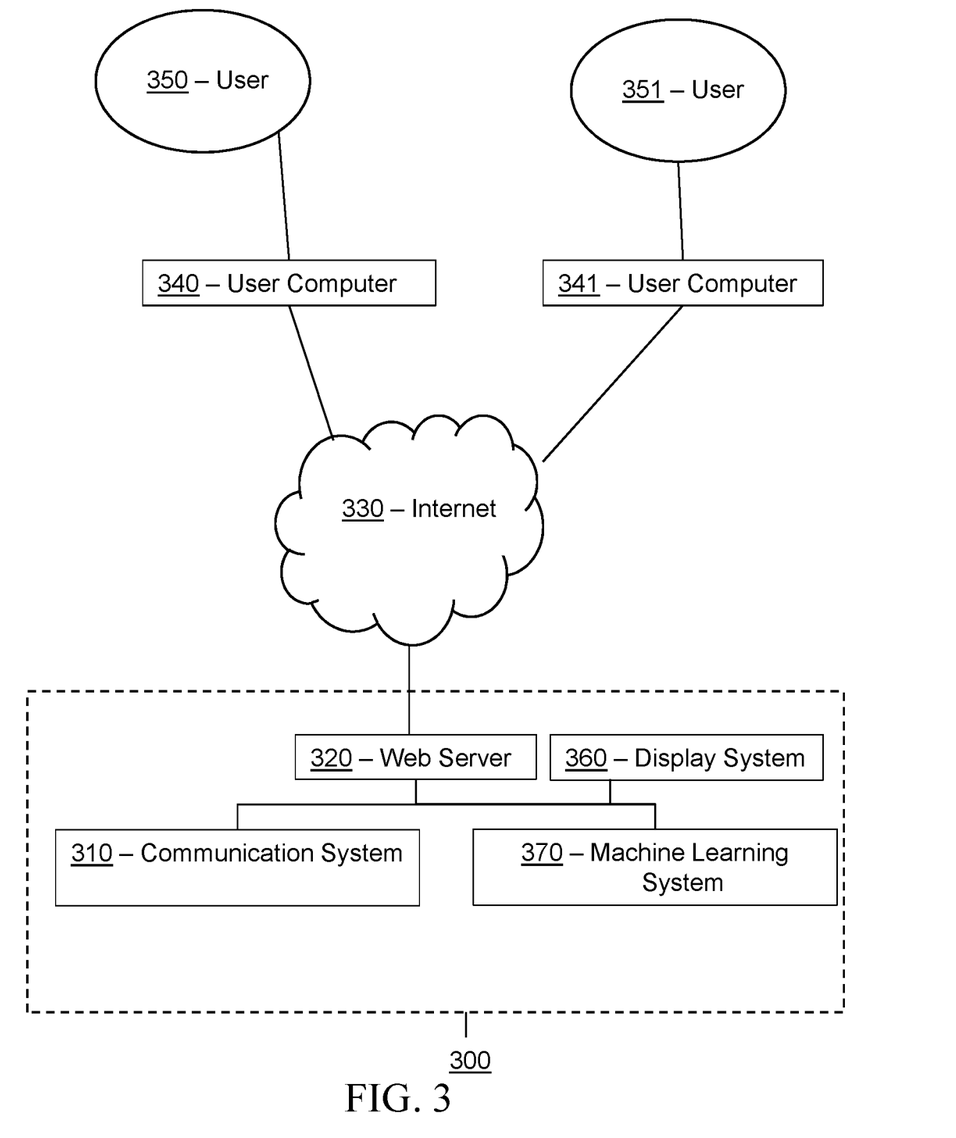
FIG. 3 illustrates a representative block diagram of a system, according to an embodiment.

Turning ahead in the drawings, FIG. 3 illustrates a block diagram of a system 300 that can be employed for optimizing targeted advertising through social media interactions, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communication system 310, a web server 320, a display system 360, and/or a machine learning system 370. Communication system 310, web server 320, display system 360, and/or machine learning system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communication system 310, web server 320, display system 360, and/or machine learning system 370. Additional details regarding communication system 310, web server 320, display system 360, and machine learning system 370 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wa., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wa., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, communication system 310, web server 320, display system 360, and/or machine learning system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communication system 310, web server 320, display system 360, and/or machine learning system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communication system 310, web server 320, display system 360, and/or machine learning system 370. In a similar manner, the processing module(s) and the memory storage module(s) can be local and/or remote to each other.

In many embodiments, communication system 310, web server 320, display system 360, and/or machine learning system 370 can be configured to communicate with one or more user computers 340 and 341. In some embodiments, user computers 340 and 341 also can be referred to as customer computers. In some embodiments, communication system 310, web server 320, display system 360, and/or machine learning system 370 can communicate or interface (e.g., interact) with one or more customer computers (such as user computers 340 and 341) through a network or internet 330. Internet 330 can be an intranet that is not open to the public. Accordingly, in many embodiments, communication system 310, web server 320, display system 360, and/or machine learning system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, communication system 310, web server 320, display system 360, and/or machine learning system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communication system 310, web server 320, display system 360, machine learning system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Advertisements on social media websites are very popular among advertisers because people spend a significant amount of spare time on social media websites and mobile applications. For some products and services, it is relatively easy to target a specific population to show the advertisements. In an ecommerce or online retailer setting, however, it is more difficult to target specific populations because (1) different kinds of combination of products can be presented to users, and (2) different advertisement designs and product lists should target different populations. Various systems and methods described herein are useful for prospecting new users on social media websites with advertisement. In some embodiments, systems and methods of this disclosure use internal user behavior data to build a targeting model that can be used target new outside users on social media websites and bring these new users to website of the online retailer to make a purchase.

Figure 5:
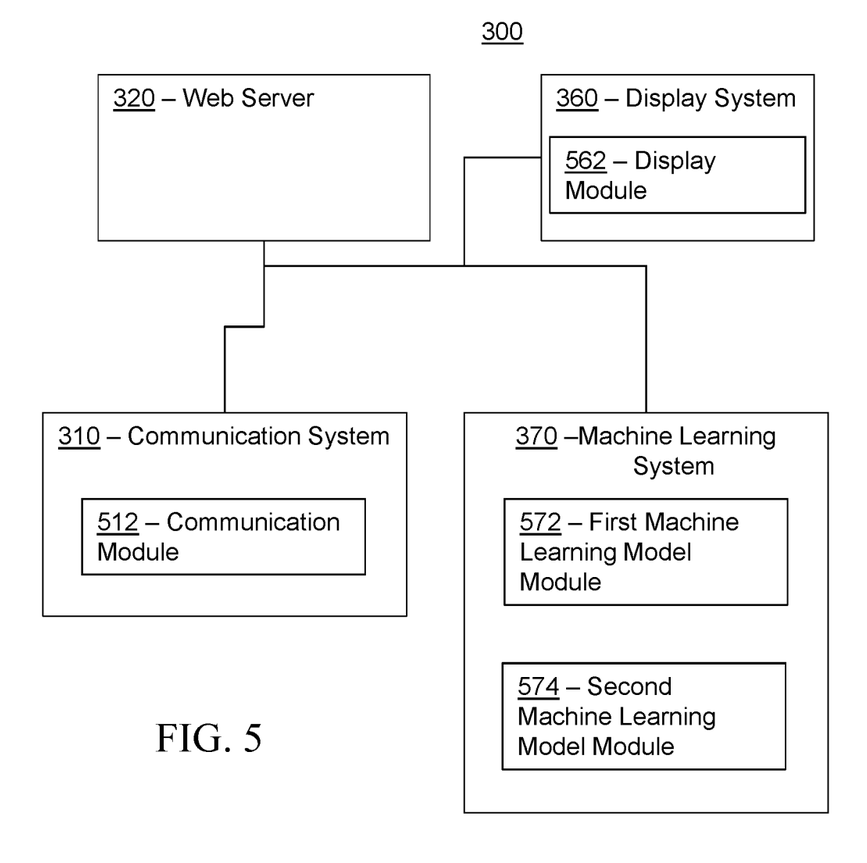
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, 572, and/or 574 (FIG. 5). Such non-transitory memory storage modules can be part of a computer system such as communication system 310, web server 320, display system 360, and/or machine learning system 370 (FIGS. 3 & 5). The processing module(s) can be similar or identical to the processing module(s) described above with respect to computer system 100 (FIG. 1).

Many embodiments of method 400 can be utilized in prospecting for new users for an online retailer in social media advertisements. As shall be described in greater detail below, some embodiments of method 400 include two stages: (1) a first stage that uses internal data from the website of the online retailer to find demographic patterns of customers buying specific products, and then applying demographic pattern rules to advertisement platforms of one or more outside social media websites to target future customers; and (2) a second stage that applies an iterative approach to use behavioral signals of these customers on the social media website and/or the website of the online retailer to select the most promising customers to further target. As more data is collected about these future or new customers on the social medial website and/or the website of the online retailer, further targeting can be performed more precisely.

In many embodiments of method 400, the first stage can comprise three or more activities. For example, a first activity can comprise preparing a popular and high-conversion product list within one sub-category to place in the advertisement. Preparing this product list can comprise an activity 405 of accessing purchase information history for (1) one or more first products in a first subcategory of a category of products for sale by an online retailer and (2) one or more second products in a second subcategory of the category of products for sale by the retailer. While reference is made herein to categories and subcategories, it is contemplated that the categories and subcategories can comprise any type of grouping and subgrouping used by a retailer. For example, a category can comprise electronics, and subcategories can comprise TV & video, cell phones, home automation, wearable devices, tablet computers, and/or desktop computers. Furthermore, while reference is made herein to an online retailer, it is contemplated that the online retailer can comprise a retailer that is exclusively an online retailer, or a retailer that is both an online retailer and a brick and mortar retailer. Thus, at least a portion of the portion of the purchase information history can, in some embodiments, include purchase information history from the website of the online retailer and/or the brick and mortar store of the online retailer.

In some embodiments, activity 405 can comprise using a distributed network comprising distributed memory architecture to access or receive purchase information history. This distributed architecture can reduce the impact on the network and system resources to reduce congestion in bottlenecks while still allowing data to be accessible from a central location. In some embodiments accessing the online catalog is performed while a user is shopping on a website of the online retailer, e.g., when a user enters a search query, browses categories of products, and/or sorts products.

In many embodiments, the purchase information history can comprise demographic data of (a) a plurality of first users that have purchased the one or more first products and (b) a plurality of second users that have purchased the one or more second products. The purchases in the purchase information history can be purchases made online and/or in brick and mortar stores in various embodiments. Furthermore, subcategories can be ranked by numbers of orders in each subcategory, and the one or more products in the highest ranked subcategory can be used in one or more advertisements. In doing so, customers or users buying these one or more products are likely to have similar demographic characteristics. For example, in some embodiments, method 400 (FIG. 4) can comprise an activity of determining, from the purchase information history, the one or more first products are the highest selling or most popular in the category of products.

A second activity of the first stage can comprise training machine learning models using user behavior data inside the website of the online retailer to target people buying and not buying in a particular subcategory. Thus, method 400 can comprise an activity 410 of training a first machine learning model configured to obtain first population demographic data for the one or more first products. More particularly, training the first machine learning model can comprise one or more activities. For example, training the first machine learning model can comprise formulating the first training model as a binary classification problem. Thus, activity 410 can comprise activities of defining a first label, such as 1, for the plurality of first users that have purchased the one or more first products in the first subcategory within a first predetermined period of time, and also defining a second label, such as 0, for the plurality of second users that have purchased the one or more second products in the second category of products within the first predetermined period of time and have not purchased the one or more first products in the first category of products within the first predetermined period of time.

In many embodiments, activity 410 of training the first machine learning model can comprise an activity matching the demographic data acquired externally with the plurality of first users and the plurality of second users. Data acquired externally can comprise data acquired outside of the online retailer, such as but not limited to data acquired through outside vendors like credit bureaus, public records, and/or social media data vendors. Once acquired, external data can be matched with internal users, through two or more of name, address, email, phone number. This matching can be an assigning of demographic data acquired outside the online retailer to the internal users. Once matched with internal users, the external demographic data can be used for training targeting models. The demographic data can comprise one or more of an age, a gender, an ethnic group, a location, a number of children, an age of any children, one or more interests, or one or more shopping habits for users. Thus, in some embodiments, the input features of the first machine learning model can comprise demographic data acquired externally and matched with internal users.

In many embodiments, activity 410 can comprise using the purchase information history, the first set of rules, and/or the demographic data as matched to train the first machine learning model. The first set of rules can comprise one or more first machine learning algorithms comprising at least one decision tree, a first logistic regression, a first support vector machine, or at least one first neural network. In particular embodiments, the one or more first machine learning algorithms can comprise at least the at least one decision tree. Decision tree models are relatively easy to convert to rules and to apply to online advertisement platforms. To train a decision tree, R, python scikit-learn, and/or or other open source or commercially available software can be used.

In some embodiments, activity 410 of training the first machine learning model can further comprise an activity of limiting a growth depth of the at least one decision tree. A decision tree can be limited to a certain number of levels to reduce complexity. For example, a decision tree model could be used to obtain results to allow the online retailer to target people who are buying Halloween costumes. The decision tree model can indicate that female customers with an age less than or equal to forty-three years have the highest probability to buy Halloween costumes. Once the decision tree model is created, rules can be created according to the results of the decision tree, as long as the online advertisement platform provides filters to narrow down the target population with the same attributes. In some embodiments, one more leaf nodes (e.g., bottom level nodes) with higher purchase probability can be targeted. Additional, more complex rules can include children information and interests on the decision tree.

Continuing with FIG. 4, method 400 can comprise an activity 415 of performing one or more first iterations of the first machine learning model to obtain the first population demographic data for the one or more first products. Once the first population demographic data for the one or more first products has been obtained, the first population demographic data can be matched with the external demographic data to target new users. Thus, in some embodiments, method 400 also can comprise an activity of determining the new users are candidates for at least the first advertisement based on one or more leaf nodes of the at least one decision tree comprising a highest purchase probability.

A third activity of the first stage can comprise applying the first machine learning model to target new users on social media websites or other online advertisement platforms. For example, method 400 also can comprise an activity 420 of coordinating a first display of a first advertisement associated with the one or more first products on social media webpages of new users corresponding to a portion of the first population demographic data. The first advertisement can comprise a plurality of advertisements for the first product.

The first product also can be coordinated for display on social media webpages of new users comprising demographic data that matches at least a portion of the demographic data determined for the one or more first products from the plurality of first users and/or the plurality of second users. The social media webpages can comprise any social media webpages known in the art, such as but not limited to Facebook® webpages, Instagram® webpages, Twitter® webpages, LinkedIn® webpages, and the like.

In many embodiments, the workflow of the first stage can be automated, and advertisement campaigns can be created automatically by system 300 (FIG. 3). In some embodiments, then, method 400 (FIG. 4) can comprise an activity of automatically finding best-selling subcategories, preparing labels, preparing model training data, training machine learning models, and, finally, converting decision tree models to rules that can be applied to online advertisement platforms. This automation process can sometimes require that external demographic data be mapped to the demographic filters in the advertisement platform. Multiple mapping can be maintained if the advertisement campaign is launched on multiple platforms.

Method 400 also can comprise one or more activities in a second stage. In the second stage, an iterative approach using behavioral signals of customers on the social media website and/or the website of the online retailer is used to select the most promising customers to further target with advertisements. As more data of these future customers is collected, additional and more precise targeted advertising can be applied.

In particular, the second stage can comprise an activity 425 of receiving an indication that one or more of the new users selected or clicked on the first advertisement displayed on the social media webpages. Method 400 also can comprise an activity 430 of accessing additional information of the one or more of the new users. The additional information of the new users comprises one or more of: (1) social media webpages liked or followed by the new users; (2) new demographic data of the new users; (3) product-related signals comprising one or more of product page visits during a second predetermined period of time or add-to-cart behavior by the new users during the second predetermined period of time; (4) use of mobile devices by the new users; (5) whether the new users downloaded a mobile application for the online retailer; or (6) price sensitivity of the new users. The social media webpages likes or follows by the new users also can comprise other social media interactions by the new users, such as but not limited to social media posts that the new users like or comment, content of comments made on social media by the new users, friends of contacts of the new users on the social media website, and the like. The additional information can comprise product signals and also can be aggregated on different levels of granularity such as but not limited to department, category, subcategory, and/or other product attributes. These product signals also can act as summary of new users' interest and purchase propensity. In some embodiments, this additional information of new customers targeted in the first stage can be collected when the new customers visit the website of the online retailer.

Method 400 can comprise an activity 435 of training, using a second set of rules and the additional information of the one or more of the new users, a second machine learning model configured to obtain additional data for the one or more first products. In many embodiments, activity 435 of training the second machine learning model can comprise various activities. For example, activity 435 also can include activities of labeling a first set of the new users who make a purchase from the online retailer, and also labeling a second set of the new users who do not make a purchase from the online retailer.

Once the signals and labels are prepared, a classification model can be formulated to predict new customers' or users' propensity to make purchases. Thus, activity 435 also can comprise an activity of using the second set of rules, the first set of the new users, the second set of the new users, and the additional information to train the second machine learning model. The second set of rules can comprise one or more second machine learning algorithms comprising one or more of a second logistic regression, a second support vector machine, one or more second neural networks, a random forest, or boosted decision trees. The second machine learning model also can be applied to all new customers to identify the most promising customers who are most likely to eventually convert the advertisement and make a purchase based on the advertisement. In some embodiments, promising customers can comprise customers with a high propensity to convert on advertisements.

The second stage of data collection and learning processes can be performed iteratively as more user behavior data is collected. Thus, in many embodiments, method 400 can comprise an activity 440 of performing one or more second iterations of the second machine learning model to obtain the additional data for the one or more first products. Using the additional data, method 400 can comprise an activity of determining the additional new users are candidates for the first advertisement based on the additional data obtained by the second machine learning model. By performing multiple iterations, data or knowledge about customers, their purchase interest and propensity to buy will be more accurate over time. This accuracy ultimately may guide the allocation and spending of marketing money. For example, money may be spent on customers with the highest probability to convert advertisements into purchases. Using a multiple iterative approach, the target population can be narrowed down using the multiple iterations and continually adjusted demographic, behavioral, interest and transactional data of the new users.

Method 400 can comprise an activity 445 of coordinating a second display of the first advertisement associated with the one or more first products on additional social media webpages of additional new users corresponding to at least a portion of the additional data for the one or more first products. The first advertisement can comprise the same advertisement as previously displayed to the new users, or can comprise different advertisement related to the one or more first products to target the additional new users. The additional new users can include at least a portion of the new users referenced previously herein, or can comprise a discrete, non-overlapping set of new users.

In some embodiments, method 400 also can optionally comprise an activity of determining the additional new users are candidates for a second advertisement associated with one or more additional products and different from the first advertisement based on the additional data obtained by the second machine learning model. For example, the second machine learning model can determine that additional new users are candidates for other products that are different from the one or more first products and/or the one or more second products. More particularly, method 400 also can comprise an activity of ranking the one or more additional products to recommend to the additional new users based on the additional data obtained by the second machine learning model. For example, the second machine learning mode can rank additional products that are most likely to be selected by the additional new users. In these or other embodiments, method 400 also can optional comprise an activity of coordinating a third display of the second advertisement on the additional social media webpages of the additional new users.

FIG. 5 illustrates a block diagram of a portion of system 300 comprising communication system 310, web server 320, display system 360, and/or machine learning system 370, according to the embodiment shown in FIG. 3. Each of communication system 310, web server 320, display system 360, and/or machine learning system 370, is merely exemplary and not limited to the embodiments presented herein. Each of communication system 310, web server 320, display system 360, and/or machine learning system 370, can be employed in many different embodiments or examples not specifically depicted or described herein. In some embodiments, certain elements or modules of communication system 310, web server 320, display system 360, and/or machine learning system 370, can perform various procedures, processes, and/or acts. In other embodiments, the procedures, processes, and/or acts can be performed by other suitable elements or modules.

In many embodiments, communication system 310 can comprise non-transitory memory storage module 512. Memory storage module 512 can be referred to as communication module 512. In many embodiments, communication module 512 can store computing instructions configured to run on one or more processing modules and perform one or more acts of method 400 (FIG. 4) (e.g., activity 405 of accessing purchase information history for (1) one or more first products in a first subcategory of a category of products for sale by an online retailer and (2) one or more second products in a second subcategory of the category of products for sale by the retailer, activity 425 of receiving an indication that one or more of the new users selected the first advertisement displayed on the social media webpages, and activity 430 of accessing additional information of the one or more of the new users (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 420 of coordinating a first display of a first advertisement associated with the one or more first products on social media webpages of new users corresponding to a portion of the first population demographic data, and activity 445 of coordinating a second display of the first advertisement associated with the one or more first products on additional social media webpages of additional new users corresponding to at least a portion of the additional data for the one or more first products (FIG. 4)).

In many embodiments, machine learning system 370 can comprise non-transitory memory storage module 572. Memory storage module 572 can be referred to as first machine learning model module 572. In many embodiments, first machine learning model module 572 can store computing instructions configured to run on one or more processing modules and perform one or more acts of method 400 (FIG. 4) (e.g., activity 410 of training a first machine learning model configured to obtain first population demographic data for the one or more first products, and activity 415 of performing one or more first iterations of the first machine learning model to obtain the first population demographic data for the one or more first products (FIG. 4)).

In many embodiments, machine learning system 370 can comprise non-transitory memory storage module 574.

Memory storage module 574 can be referred to as second machine learning model module 574. In many embodiments, second machine learning model module 574 can store computing instructions configured to run on one or more processing modules and perform one or more acts of method 400 (FIG. 4) (e.g., activity 435 of training, using a second set of rules and the additional information of the one or more of the new users, a second machine learning model configured to obtain additional data for the one or more first products, and activity 440 of performing one or more second iterations of the second machine learning model to obtain the additional data for the one or more first products (FIG. 4)).

Although systems and methods for optimizing targeted advertising through social media interactions have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory storage devices storing computing instructions configured to run on the one or more processors and perform:
   accessing, using the one or more processors, purchase information history from a web site of an online retailer for:
   (1) one or more first products in a first subcategory of a category of products for sale by the online retailer; and
   (2) one or more second products in a second subcategory of the category of products for sale by the online retailer, wherein:
   the purchase information history comprises demographic data of:
   (a) a plurality of first users that have purchased the one or more first products; and
   (b) a plurality of second users that have purchased the one or more second products;
   training, using a first set of rules, the purchase information history of the category of products, and the one or more processors, a first machine learning model configured to obtain first population demographic data for the one or more first products, wherein:
   the first machine learning model comprises a decision tree; and
   training the first machine learning model comprises:
   limiting a growth depth of the decision tree; and
   creating one or more rules according to results of the decision tree when any demographic data of the plurality of first users or the plurality of second users is input into the first machine learning model;
   performing, using the one or more processors, one or more first iterations of the first machine learning model to obtain the first population demographic data for the one or more first products;
   coordinating, using the one or more processors, a first display of a first advertisement associated with the one or more first products on social media webpages of new users corresponding to at least a portion of the first population demographic data, wherein neither of the plurality of first users nor the plurality of second users comprise the new users;
   receiving, from one or more electronic devices of the new users, an indication that one or more of the new users selected the first advertisement displayed on the social media webpages;
   accessing, using the one or more processors, additional information of the one or more of the new users;
   training, using a second set of rules, the additional information of the one or more of the new users, and the one or more processors, a second machine learning model configured to obtain additional data for the one or more first products;
   performing, using the one or more processors, one or more second iterations of the second machine learning model to obtain the additional data for the one or more first products; and
   coordinating, using the one or more processors, a second display of the first advertisement associated with the one or more first products on additional social media webpages of additional new users corresponding to at least a portion of the additional data for the one or more first products, wherein none of the plurality of first users, the plurality of second users, or the new users comprise the additional new users.

2. The system of claim 1, wherein the one or more non-transitory storage devices storing the computing instructions are further configured to run on the one or more processors and perform:
   determining, using the purchase information history, that the one or more first products are either a highest selling product in the category of products or a most popular product in the category of products.

3. The system of claim 1, wherein training the first machine learning model comprises:
   defining a first label for the plurality of first users that have purchased the one or more first products in the first subcategory of the category of products within a first predetermined period of time;

defining a second label for the plurality of second users that have (1) purchased the one or more second products in the second subcategory of the category of products within the first predetermined period of time and (2) have not purchased the one or more first products in the first subcategory of the category of products within the first predetermined period of time;

matching external demographic data acquired externally with the demographic data of the plurality of first users and the plurality of second users, the external demographic data acquired externally comprising, for each of the plurality of first users and the plurality of second users, one or more of:
a respective age;
a respective gender;
a respective ethnic group;
a respective location;
a respective number of children;
a respective age of any children;
one or more respective interests; or
one or more respective shopping habits; and using the purchase information history, the first set of rules, and the external demographic data acquired externally, as matched, to train the first machine learning model, wherein:
the first set of rules further comprises one or more first machine learning algorithms comprising at least one of:
a first logistic regression;
a first support vector machine; or
at least one first neural network.

4. The system of claim 1, wherein
the one or more non-transitory storage devices storing the computing instructions are further configured to run on the one or more processors and perform:
determining the new users are candidates for at least the first advertisement based on one or more leaf nodes of the decision tree, the one or more leaf nodes comprising a highest purchase probability.

5. The system of claim 1, wherein the additional information of the one or more of the new users comprises one or more of:
(1) social media webpages liked or followed by the one or more of the new users;
(2) new demographic data of the one or more of the new users;
(3) product-related signals comprising one or more of product page visits during a second predetermined period of time or add-to-cart behavior by the one or more of the new users during the second predetermined period of time;
(4) use of mobile devices by the one or more of the new users;
(5) whether the one or more of the new users download a mobile application for the online retailer; or
(6) price sensitivity of the one or more of the new users.

6. The system of claim 1, wherein training the second machine learning model comprises:
labeling a first set of the new users who make a purchase from the online retailer;
labeling a second set of the new users who do not make a purchase from the online retailer; and
using the second set of rules, the first set of the new users, the second set of the new users, and the additional information of the one or more of the new users to train the second machine learning model, wherein the second set of rules comprises one or more second machine learning algorithms comprising one or more of:
a second logistic regression;
a second support vector machine;
one or more second neural networks;
a random forest; or
boosted decision trees.

7. The system of claim 6, wherein:
performing the one or more second iterations of the second machine learning model comprises performing the one or more second iterations of the second machine learning model to obtain the additional data, the additional data identifying the additional new users as users comprising a high propensity to purchase the one or more first products; and
the one or more non-transitory storage devices storing the computing instructions are further configured to run on the one or more processors and perform:
determining the additional new users are candidates for the first advertisement based on the additional data obtained by the second machine learning model.

8. The system of claim 7, wherein the one or more non-transitory storage devices storing the computing instructions are further configured to run on the one or more processors and perform:
determining the additional new users are candidates for a second advertisement associated with one or more additional products and different from the first advertisement based on the additional data obtained by the second machine learning model; and
coordinating a third display of the second advertisement on the additional social media webpages of the additional new users.

9. The system of claim 8, wherein the one or more non-transitory storage devices storing the computing instructions are further configured to run on the one or more processors and perform:
ranking the one or more additional products to recommend to the additional new users based on the additional data obtained by the second machine learning model.

10. The system of claim 1, wherein:
the one or more non-transitory storage devices storing the computing instructions are further configured to run on the one or more processors and perform:
determining, using the purchase information history, that the one or more first products are either a highest selling product in the category of products or a most popular product in the category of products;
training the first machine learning model comprises:
defining a first label for the plurality of first users that have purchased the one or more first products in the first subcategory of the category of products within a first predetermined period of time;
defining a second label for the plurality of second users that have (1) purchased the one or more second products in the second subcategory of the category of products within the first predetermined period of time and (2) have not purchased the one or more first products in the first subcategory of the category of products within the first predetermined period of time;
matching external demographic data acquired externally with the demographic data of the plurality of first users and the plurality of second users, the external demographic data acquired externally comprising, for each of the plurality of first users and the plurality of second users, one or more of:
a respective age;
a respective gender;
a respective ethnic group;
a respective location;
a respective number of children;
a respective age of any children;
one or more respective interests; or
one or more respective shopping habits; and
using the purchase information history, the first set of rules, and the external demographic data acquired externally as matched to train the first machine learning model, wherein:
the first set of rules comprises one or more first machine learning algorithms comprising at least one of:
a first logistic regression;
a first support vector machine; or
at least one first neural network;
the one or more non-transitory storage devices storing the computing instructions are further configured to run on the one or more processors and perform:
determining the new users are candidates for at least the first advertisement based on one or more leaf nodes of the decision tree, the one or more leaf nodes comprising a highest purchase probability;
the additional information of the one or more of the new users comprises one or more of:
(1) social media webpages liked or followed by the one or more of the new users;
(2) new demographic data of the one or more of the new users;
(3) product-related signals comprising one or more of product page visits during a second predetermined period of time or add-to-cart behavior by the one or more of the new users during the second predetermined period of time;
(4) use of mobile devices by the one or more of the new users;
(5) whether the one or more of the new users download a mobile application for the online retailer; or
(6) price sensitivity of the one or more of the new users;
training the second machine learning model comprises:
labeling a first set of the new users who make a purchase from the online retailer;
labeling a second set of the new users who do not make a purchase from the online retailer; and
using the second set of rules, the first set of the new users, the second set of the new users, and the additional information of the one or more of the new users to train the second machine learning model, wherein the second set of rules comprises one or more second machine learning algorithms comprising one or more of:
a second logistic regression;
a second support vector machine;
one or more second neural networks;
a random forest; or
boosted decision trees;
performing the one or more second iterations of the second machine learning model comprises performing the one or more second iterations of the second machine learning model to obtain the additional data, the additional data identifying the additional new users as users comprising a high propensity to purchase the one or more first products; and the one or more non-transitory storage devices storing the computing instructions are further configured to run on the one or more processors and perform acts of:
determining the additional new users are candidates for the first advertisement based on the additional data obtained by the second machine learning model;
determining the additional new users are candidates for a second advertisement associated with one or more additional products and different from the first advertisement based on the additional data obtained by the second machine learning model;
coordinating a third display of the second advertisement on the additional social media webpages of the additional new users; and
ranking the one or more additional products to recommend to the additional new users based on the additional data obtained by the second machine learning model.

11. A method comprising:
accessing, using one or more processors, purchase information history from a website of an online retailer for:
(1) one or more first products in a first subcategory of a category of products for sale by the online retailer; and
(2) one or more second products in a second subcategory of the category of products for sale by the online retailer, wherein:
the purchase information history comprises demographic data of:
(a) a plurality of first users that have purchased the one or more first products; and
(b) a plurality of second users that have purchased the one or more second products;
training, using a first set of rules, the purchase information history of the category of products, and the one or more processors, a first machine learning model configured to obtain first population demographic data for the one or more first products, wherein:
the first machine learning model comprises a decision tree; and
training the first machine learning model comprises:
limiting a growth depth of the decision tree; and
creating one or more rules according to results of the decision tree when any demographic data of the plurality of first users or the plurality of second users is input into the first machine learning model;
performing, using the one or more processors, one or more first iterations of the first machine learning model to obtain the first population demographic data for the one or more first products;
coordinating, using the one or more processors, a first display of a first advertisement associated with the one or more first products on social media webpages of new users corresponding to at least a portion of the first population demographic data, wherein neither of the plurality of first users nor the plurality of second users comprise the new users;
receiving, from one or more electronic devices of the new users, an indication that one or more of the new users selected the first advertisement displayed on the social media webpages;
accessing, using the one or more processors, additional information of the one or more of the new users;
training, using a second set of rules, the additional information of the one or more of the new users, and the one or more processors, a second machine learning model configured to obtain additional data for the one or more first products;

performing, using the one or more processors, one or more second iterations of the second machine learning model to obtain the additional data for the one or more first products; and coordinating, using the one or more processors, a second display of the first advertisement associated with the one or more first products on additional social media webpages of additional new users corresponding to at least a portion of the additional data for the one or more first products, wherein none of the plurality of first users, the plurality of second users, or the new users comprise the additional new users.

12. The method of claim 11, further comprising determining, using the purchase information history, that the one or more first products are either a highest selling product in the category of products or a most popular product in the category of products.

13. The method of claim 11, wherein training the first machine learning model comprises:
defining a first label for the plurality of first users that have purchased the one or more first products in the first subcategory of the category of products within a first predetermined period of time;
defining a second label for the plurality of second users that have (1) purchased the one or more second products in the second subcategory of the category of products within the first predetermined period of time and (2) have not purchased the one or more first products in the first subcategory of the category of products within the first predetermined period of time;
matching external demographic data acquired externally with the demographic data of the plurality of first users and the plurality of second users, the external demographic data acquired externally comprising, for each of the plurality of first users and the plurality of second users, one or more of:
a respective age;
a respective gender;
a respective ethnic group;
a respective location;
a respective number of children;
a respective age of any children;
one or more respective interests; or
one or more respective shopping habits; and
using the purchase information history, the first set of rules, and the external demographic data acquired externally as matched to train the first machine learning model, wherein:
the first set of rules further comprises one or more first machine learning algorithms comprising at least one of:
a first logistic regression;
a first support vector machine; or
at least one first neural network.

14. The method of claim 11, wherein:
the method further comprises determining the new users are candidates for at least the first advertisement based on one or more leaf nodes of the decision tree, the one or more leaf nodes comprising a highest purchase probability.

15. The method of claim 11, wherein the additional information of the one or more of the new users comprises one or more of:

(1) social media webpages liked or followed by the one or more of the new users;
(2) new demographic data of the one or more of the new users;
(3) product-related signals comprising one or more of product page visits during a second predetermined period of time or add-to-cart behavior by the one or more of the new users during the second predetermined period of time;
(4) use of mobile devices by the one or more of the new users;
(5) whether the one or more of the new users download a mobile application for the online retailer; or
(6) price sensitivity of the one or more of the new users.

16. The method of claim 11, wherein training the second machine learning model comprises:
labeling a first set of the new users who make a purchase from the online retailer;
labeling a second set of the new users who do not make a purchase from the online retailer; and
using the second set of rules, the first set of the new users, the second set of the new users, and the additional information of the one or more of the new users to train the second machine learning model, wherein the second set of rules comprises one or more second machine learning algorithms comprising one or more of:
a second logistic regression;
a second support vector machine;
one or more second neural networks;
a random forest; or
boosted decision trees.

17. The method of claim 16, wherein:
performing the one or more second iterations of the second machine learning model comprises performing the one or more second iterations of the second machine learning model to obtain the additional data, the additional data identifying the additional new users as users comprising a high propensity to purchase the one or more first products; and
the method further comprises determining the additional new users are candidates for the first advertisement based on the additional data obtained by the second machine learning model.

18. The method of claim 17, further comprising:
determining the additional new users are candidates for a second advertisement associated with one or more additional products and different from the first advertisement based on the additional data obtained by the second machine learning model; and
coordinating a third display of the second advertisement on the additional social media webpages of the additional new users.

19. The method of claim 18, further comprising ranking the one or more additional products to recommend to the additional new users based on the additional data obtained by the second machine learning model.

20. The method of claim 11, wherein:
the method further comprises determining, using the purchase information history, that the one or more first products are either a highest selling product in the category of products or a most popular product in the category of products;
training the first machine learning model comprises:
defining a first label for the plurality of first users that have purchased the one or more first products in the first subcategory of the category of products within a first predetermined period of time;

defining a second label for the plurality of second users that have (1) purchased the one or more second products in the second subcategory of the category of products within the first predetermined period of time and (2) have not purchased the one or more first products in the first subcategory of the category of products within the first predetermined period of time;

matching external demographic data acquired externally with the demographic data of the plurality of first users and the plurality of second users, the external demographic data acquired externally comprising, for each of the plurality of first users and the plurality of second users, one or more of:
 a respective age;
 a respective gender;
 a respective ethnic group;
 a respective location;
 a respective number of children;
 a respective age of any children;
 one or more respective interests; or
 one or more respective shopping habits; and using the purchase information history, the first set of rules, and the external demographic data acquired externally as matched to train the first machine learning model, wherein:
 the first set of rules comprises one or more first machine learning algorithms comprising at least one of:
  a first logistic regression;
  a first support vector machine; or
  at least one first neural network;

the method further comprises determining the new users are candidates for at least the first advertisement based on one or more leaf nodes of the decision tree, the one or more leaf nodes comprising a highest purchase probability;

the additional information of the one or more of the new users comprises one or more of:
 (1) social media webpages liked or followed by the one or more of the new users;
 (2) new demographic data of the one or more of the new users;
 (3) product-related signals comprising one or more of product page visits during a second predetermined period of time or add-to-cart behavior by the one or more of the new users during the second predetermined period of time;
 (4) use of mobile devices by the one or more of the new users;
 (5) whether the one or more of the new users download a mobile application for the online retailer; or
 (6) price sensitivity of the one or more of the new users;

training the second machine learning model comprises:
 labeling a first set of the new users who make a purchase from the online retailer;
 labeling a second set of the new users who do not make a purchase from the online retailer; and
 using the second set of rules, the first set of the new users, the second set of the new users, and the additional information of the one or more of the new users to train the second machine learning model, wherein the second set of rules comprises one or more second machine learning algorithms comprising one or more of:
  a second logistic regression;
  a second support vector machine;
  one or more second neural networks;
  a random forest; or
  boosted decision trees;

performing the one or more second iterations of the second machine learning model comprises performing the one or more second iterations of the second machine learning model to obtain the additional data, the additional data identifying the additional new users as users comprising a high propensity to purchase the one or more first products; and the method further comprises:
 determining the additional new users are candidates for the first advertisement based on the additional data obtained by the second machine learning model;
 determining the additional new users are candidates for a second advertisement associated with one or more additional products and different from the first advertisement based on the additional data obtained by the second machine learning model;
 coordinating a third display of the second advertisement on the additional social media webpages of the additional new users; and
 ranking the one or more additional products to recommend to the additional new users based on the additional data obtained by the second machine learning model.

* * * * *